UNITED STATES PATENT OFFICE.

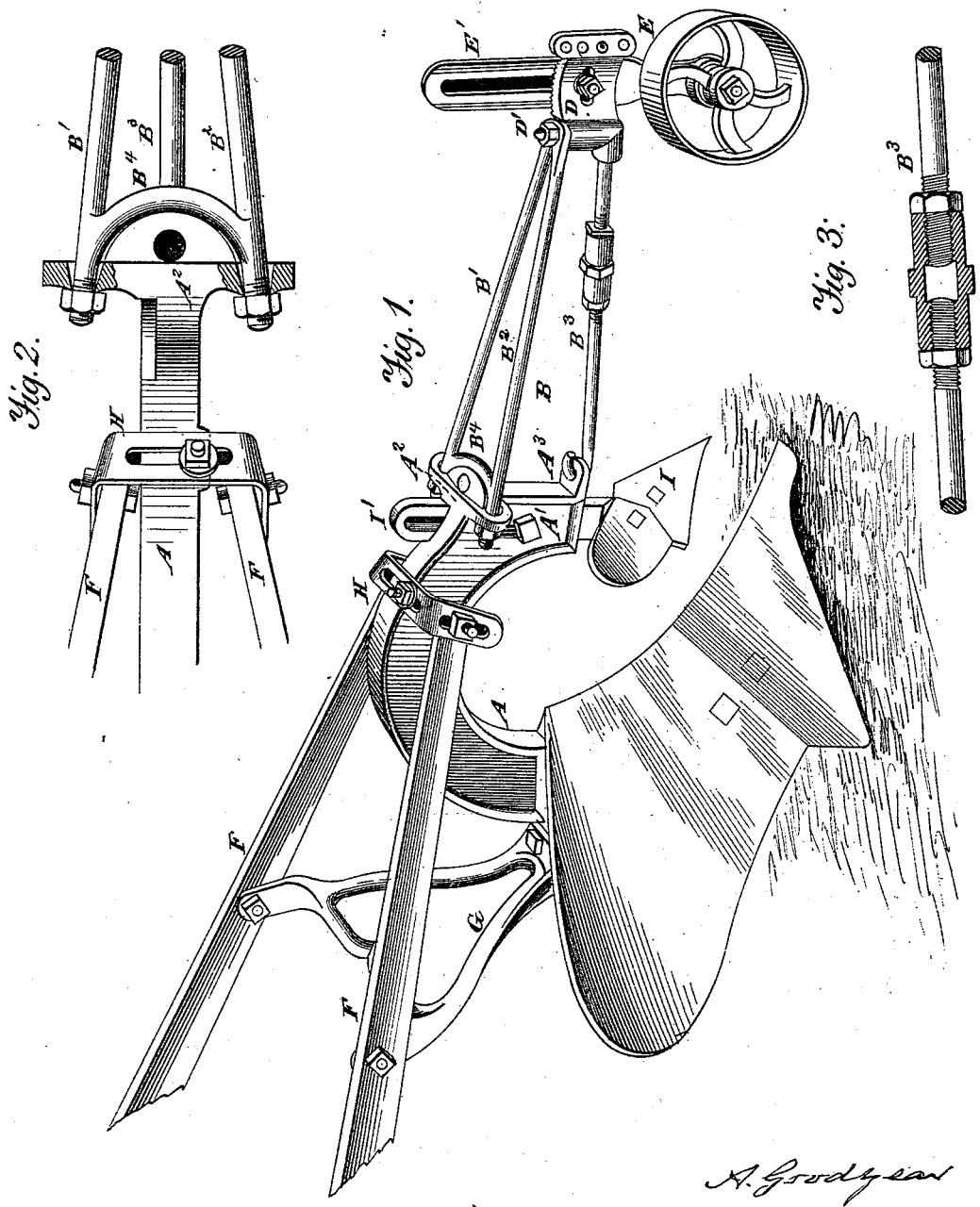

ANDREW GOODYEAR, OF ALBION, MICHIGAN.

IMPROVEMENT IN PLOWS.

Specification forming part of Letters Patent No. 213,188, dated March 11, 1879; application filed March 14, 1878.

*To all whom it may concern:*

Be it known that I, ANDREW GOODYEAR, of Albion, in the county of Calhoun and State of Michigan, have invented certain new and useful Improvements in Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to the mode of attaching the handles to the plow.

In the annexed drawings, making part of this specification, Figure 1 is a perspective view of my improved plow. Fig. 2 is a plan view of the front end of the standard, showing the attachment of the braced beam; and Fig. 3 is a section showing the adjustment of one of the beam-braces.

The same letters are employed in all the figures in the indication of the same parts.

A is the standard, bent as shown, so as to form part of the sectional beam or draft of the plow. It is slotted, as shown at $A^1$, to receive a bolt, by which the stem or standard I' of the jointer or colter I is attached to the front end of standard A in such manner that it may be adjusted as desired by the plowman.

The beam proper, B, is formed by three brace-rods, $B^1$ $B^2$ $B^3$, which are attached to the front end of the curved standard A. The rods $B^1$ $B^2$ are fastened by nuts to the cross-head $A^2$, which is rounded in front, and the holes through which they pass are large enough to allow them to be deflected to the right or left by tightening up the nut on one rod and letting the nut off on the other.

The rods are connected by a brace, $B^4$, curved to fit the segmental end of $A^2$, and the brace $B^4$ will not interfere with the adjustment of the draft, as it will permit the rods to be adjusted, as before described.

The lower rod, $B^3$, is formed with a hook, to secure it to the standard at $A^3$, and with a sleeve and right and left screws, by which it may be lengthened or shortened.

The rods are all fastened to the clevis D, the upper one by a pin and nut, as shown at D', and the lower one by screwing it into a socket in the clevis, or by casting the clevis onto the rod.

The wheel E is attached by a slotted standard and bolt to the front of the beam in the usual manner. The handles F are also adjustably attached to the standard by means of a slotted yoke, H, and braces G. The yoke H is bent at right angles at each end. In the horizontal part is a slot, by which it can be fastened by means of a nut, so as to incline the handles to one side or the other. Other slots are formed in the vertical parts of the yoke, to which the handles are attached, by bolts and nuts, with more or less elevation, as desired.

The handles are fastened to the top of the brace G by bolts, which permit their vertical adjustment, and the brace is fastened at its foot by a single bolt, which permits the lateral adjustment of the handles.

My improved plow is distinguished from those before known in the form of the standard, which is so curved as to form not only a standard for both the plow and jointer, but also forms part of the beam or horizontal draft of the plow. This form of the standard gives increased strength, and enables the jointer to bear great strains.

The manner of securing vertical and horizontal adjustment of the handles by means of the slotted yoke differs from other devices heretofore employed for the same purpose.

What I claim as my invention, and desire to secure by Letters Patent, is—

The combination, with the beam and handles of a plow, of a yoke, H, provided with lateral slot, and having depending arms, provided with elongated slots, for the attachment of the handles, and serving to permit of the adjustment of the beam and handles, substantially as set forth.

In testimony that I claim the foregoing as my own I affix my signature in presence of two witnesses.

ANDREW GOODYEAR.

Witnesses:
 WM. R. BABCOCK,
 JAS. S. MILLER.